(12) United States Patent
Ma

(10) Patent No.: US 11,188,874 B2
(45) Date of Patent: Nov. 30, 2021

(54) BLOCK CHAIN-BASED CLAIM SETTLEMENT METHOD AND APPARATUS

(71) Applicant: ADVANCED NEW TECHNOLOGIES CO., LTD., Grand Cayman (KY)

(72) Inventor: Sui Ma, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 17/171,483

(22) Filed: Feb. 9, 2021

(65) Prior Publication Data

US 2021/0166193 A1 Jun. 3, 2021

Related U.S. Application Data

(63) Continuation of application No. PCT/CN2019/101490, filed on Aug. 20, 2019.

(30) Foreign Application Priority Data

Oct. 24, 2018 (CN) .......................... 201811244377.6

(51) Int. Cl.
*G06F 12/14* (2006.01)
*G06F 11/30* (2006.01)
(Continued)

(52) U.S. Cl.
CPC ........... *G06Q 10/10* (2013.01); *H04L 9/0618* (2013.01); *H04L 2209/38* (2013.01)

(58) Field of Classification Search
CPC .... G06Q 10/10; H04L 9/0618; H04L 2209/38
(Continued)

(56) References Cited

U.S. PATENT DOCUMENTS 10,084,607 B2 9/2018 Toll et al.
2015/0206106 A1* 7/2015 Yago ................... G06Q 20/0655
705/68
(Continued)

FOREIGN PATENT DOCUMENTS

CN 106204287 A 12/2016
CN 108009834 A 5/2018
(Continued)

OTHER PUBLICATIONS

Chunchi Liu; NormaChain: A Blockchain-Based Normalized Autonomous Transaction Settlement System for IoT-Based E-mmerce; IEEE:2018; p. 4680-4693.*

(Continued)

*Primary Examiner* — Monjur Rahim

(57) ABSTRACT

One or more embodiments of the description provide a blockchain-based claim settlement method and apparatus. The blockchain comprises a claim settlement organization node device and a service processing organization node device. The method comprises: obtaining, from a distributed database of the blockchain, a target transaction sent by the service processing organization node device, the target transaction comprising service behavior data generated by a claimant in the service processing organization node device; generating claim settlement plan logic for the claimant on the basis of the service behavior data comprised in the target transaction; and executing the claim settlement plan logic.

20 Claims, 1 Drawing Sheet

(51) Int. Cl.
  *G06Q 10/10* (2012.01)
  *H04L 9/06* (2006.01)
(58) Field of Classification Search
  USPC .......................................................... 713/189
  See application file for complete search history.

(56) References Cited

U.S. PATENT DOCUMENTS

| | | | |
|---|---|---|---|
| 2015/0379510 A1* | 12/2015 | Smith | G06Q 20/3829 705/71 |
| 2016/0035044 A1 | 2/2016 | Xu | |
| 2017/0017954 A1 | 1/2017 | Mcdonough et al. | |
| 2017/0031874 A1 | 2/2017 | Boudville | |
| 2017/0132620 A1 | 5/2017 | Miller et al. | |
| 2017/0177898 A1 | 6/2017 | Dillenberger | |
| 2017/0187535 A1 | 6/2017 | Middleton et al. | |
| 2017/0213209 A1* | 7/2017 | Dillenberger | G06F 16/2308 |
| 2017/0213289 A1* | 7/2017 | Doney | G06Q 40/025 |
| 2017/0330174 A1* | 11/2017 | Demarinis | G06F 21/62 |
| 2017/0352027 A1* | 12/2017 | Zhang | G06Q 20/065 |
| 2018/0005186 A1* | 1/2018 | Hunn | G06F 40/103 |
| 2018/0075527 A1 | 3/2018 | Nagla et al. | |
| 2018/0089758 A1* | 3/2018 | Stradling | G06F 12/1408 |
| 2018/0218176 A1* | 8/2018 | Voorhees | H04L 9/3213 |
| 2018/0218455 A1* | 8/2018 | Kolb | G06Q 20/405 |

FOREIGN PATENT DOCUMENTS

| | | |
|---|---|---|
| CN | 108122159 A | 6/2018 |
| CN | 108446992 A | 8/2018 |
| CN | 108629565 A | 10/2018 |
| CN | 109614438 A | 4/2019 |

OTHER PUBLICATIONS

First Search for Chinese Application No. 201811244377.6 dated Jan. 22, 2020.
Written Opinion and International Search Report for PCT Application No. PCT/CN2019/101490 dated Nov. 19, 2020.

* cited by examiner

BLOCK CHAIN-BASED CLAIM SETTLEMENT METHOD AND APPARATUS

CROSS REFERENCE TO RELATED APPLICATION

The present application is a continuation application of the International Patent Application No. PCT/CN2019/101490, filed on Aug. 20, 2019, and titled "BLOCK CHAIN-BASED CLAIM SETTLEMENT METHOD AND APPARATUS," which claims priority to Chinese Patent Application No. 201811244377.6 filed on Oct. 24, 2018. The entire contents of all of the above applications are incorporated herein by reference in their entirety.

TECHNICAL FIELD

The present specification relates to the field of data processing technologies, and in particular, to a blockchain-based claim settlement method and apparatus.

BACKGROUND

An insurance claim settlement agency connects with a corresponding service processing agency system, so that after service behavior data of a user that is underwritten by insurance is concluded in the service processing agency, a payment can be quickly obtained from the insurance claim settlement agency as soon as the service behavior data is reviewed by the insurance claim settlement agency. However, an implementation of the foregoing quick payment relies on the computing system stability and reliability of both of the connecting parties. That is, the computing systems at the insurance claim settlement agency and the service processing agency have to be up and functioning. When claims are reviewed, if the service behavior data of the user cannot be found through query because of an exception occurred in a system (e.g., when computing system of the service processing agency is a malfunction condition such as system downtime, database freeze, etc.), or wrong behavior data is found through the query (e.g., when computing system of the service processing agency returns erroneous results in response to the query), immeasurable risks may be directly caused to claim settlement. In addition, claim settlement of the insurance claim settlement agency heavily relies on data of the service processing agency. If a staff member of a service party conspires with an insured user, it is easy to defraud a payment, resulting in a monetary loss to the insurance claim settlement agency. Thus, the existing computing architecture for claim settlement suffers from system instability and low security.

SUMMARY

To address the current situation and problems of the claim settlement procedure provided above, this specification provides a blockchain-based claim settlement method. A blockchain includes a node device of a claim settlement agency party and a node device of a service processing agency party. The method includes: obtaining, from a distributed database of the blockchain, a target transaction sent by the node device of the service processing agency party, where the target transaction includes service behavior data generated by a claimant in the node device of the service processing agency party; generating claim settlement solution logic for the claimant based on the service behavior data included in the target transaction; and executing the claim settlement solution logic.

In still another shown implementation, the blockchain further includes a node device of a claimant, and the claim settlement solution logic includes a claim amount to be paid to the claimant; and the executing the claim settlement solution logic includes initiating a transfer transaction with an amount equal to the claim amount to a terminal of the claimant via the blockchain.

In still another shown implementation, the distributed database of the blockchain stores a policy transaction for the claimant sent by the node device of the claim settlement agency party, where the policy transaction is used for recording claim settlement logic corresponding to the claimant; and the generating claim settlement solution logic for the claimant based on the service behavior data included in the target transaction includes: obtaining the policy transaction from the distributed database of the blockchain; and generating the claim settlement solution logic for the claimant based on the service behavior data included in the target transaction and the policy transaction of the claimant.

In still another shown implementation, the service behavior data is encrypted by a public key of the claim settlement agency party, and the method further includes: decrypting, by the claim settlement agency party, the encrypted service behavior data by using a private key corresponding to the public key.

In still another shown implementation, the generating claim settlement solution logic for the claimant based on the service behavior data included in the target transaction, and executing the claim settlement solution logic includes: invoking a smart contract deployed on the blockchain, and completing the claim settlement solution logic for the claimant and executing the claim settlement solution logic based on generation logic of the claim settlement solution logic and execution logic of the claim settlement solution logic declared in the smart contract.

In still another shown implementation, the blockchain is a consortium chain, and the node device of the claim settlement agency party and the node device of the service processing agency party are member node devices of the consortium chain.

In still another shown implementation, the service processing agency party is a hospital, the claim settlement party is a medical insurance agency, and the claimant is a patient user. The consortium chain further includes a member node device of a drug agency party, a distributed database of the consortium chain records a drug pricing transaction sent by the member node device of the drug agency party, and the drug pricing transaction includes a drug price.

Correspondingly, this specification further provides a blockchain-based claim settlement apparatus. A blockchain includes a node device of a claim settlement agency party and a node device of a service processing agency party. The apparatus includes: an obtaining unit configured to obtain, from a distributed database of the blockchain, a target transaction sent by the node device of the service processing agency party, where the target transaction includes service behavior data generated by a claimant in the node device of the service processing agency party; a generation unit configured to generate claim settlement solution logic for the claimant based on the service behavior data included in the target transaction; and an execution unit configured to execute the claim settlement solution logic.

In still another shown implementation, the blockchain further includes a node device of a claimant, and the claim settlement solution logic includes a claim amount to be paid to the claimant; and the execution unit is configured to initiate a transfer transaction with an amount equal to the claim amount to a terminal of the claimant via the blockchain.

In still another shown implementation, the distributed database of the blockchain stores a policy transaction for the claimant sent by the node device of the claim settlement agency party, where the policy transaction is used for recording claim settlement logic corresponding to the claimant.

The generation unit is configured to: obtain the policy transaction from the distributed database of the blockchain; and generate the claim settlement solution logic for the claimant based on the service behavior data included in the target transaction and the policy transaction of the claimant.

In still another shown implementation, the service behavior data is encrypted by a public key of the claim settlement agency party, and the apparatus further includes: a decryption unit configured to decrypt the encrypted service behavior data by the claim settlement agency party using a private key corresponding to the public key.

In still another shown implementation, the generation unit and the execution unit are configured to: invoke a smart contract deployed on the blockchain, and complete the claim settlement solution logic for the claimant and execute the claim settlement solution logic based on generation logic of the claim settlement solution logic and execution logic of the claim settlement solution logic declared in the smart contract.

In still another shown implementation, the blockchain is a consortium chain, and the node device of the claim settlement agency party and the node device of the service processing agency party are member node devices of the consortium chain.

In still another shown implementation, the service processing agency party is a hospital, the claim settlement party is a medical insurance agency, and the claimant is a patient user. The consortium chain further includes a member node device of a drug agency party, a distributed database of the consortium chain records a drug pricing transaction sent by the member node device of the drug agency party, and the drug pricing transaction includes a drug price.

This specification further provides a computer device, including a storage and a processor, where the storage stores a computer program executable on the processor; and the processor, when executing the computer program, performs the steps of the foregoing blockchain-based claim settlement method.

It can be seen from the foregoing technical solutions that, in the blockchain-based claim settlement method and apparatus provided in this specification, the claim settlement agency party and the service processing agency party are set as the nodes of the blockchain. Based on a distributed database storage mechanism of the blockchain technology, service behavior data of a claimant user is recorded in all nodes of the blockchain in a decentralized manner, is jointly maintained by nodes of all participants, and is synchronized in real time. All service behavior data may be traced back. In this way, when the claim settlement agency party obtains the service behavior data of the claimant from the foregoing blockchain for reviewing claims, even if a node device of the service processing agency party runs into a system exception, normal execution of the foregoing claim review and payment is still not affected. In addition, based on a consensus mechanism of the blockchain, service behavior data of each claimant user cannot be tampered with after being provided, thereby ensuring the authenticity and the security of the service behavior data of the claimant user, and preventing any staff member of the service processing agency and the claimant user from tampering with the service behavior data for insurance fraud after a service behavior occurs.

DETAILED DESCRIPTION

The exemplary embodiments are described herein in detail, and examples of the embodiments are shown in the accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of this specification, but are instead only examples that are described in detail in the appended claims and are consistent with some aspects of the devices and methods in one or more embodiments of this specification.

It should be noted that in other embodiments, the steps of corresponding methods are not necessarily performed according to sequences shown and described in this specification. In some other embodiments, the methods may include more or fewer steps than those described in this specification. In addition, a single step described in this specification may be divided into multiple steps for description in other embodiments, and multiple steps described in this specification may be combined into a single step for description in other embodiments.

Figure 1:
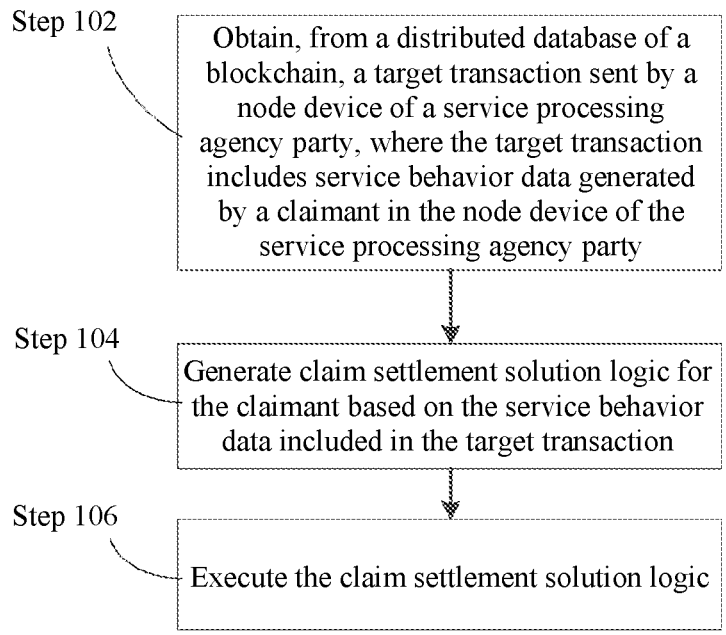
FIG. 1 is a flowchart of a blockchain-based claim settlement method, according to an embodiment of this specification.

FIG. 1 is a flowchart of a blockchain-based claim settlement method, according to an embodiment of this specification. A blockchain includes a node device of a claim settlement agency party and a node device of a service processing agency party.

The blockchain system in some embodiments may refer to a P2P network system that is achieved by nodes by using a consensus mechanism and that has a distributed data storage structure. Data in the blockchain is distributed with respective "blocks" that are consecutive in time, a latter block includes a data digest of a previous block, and a full data backup of all or a portion of nodes is implemented according to a difference between specific consensus mechanisms (such as a PoW mechanism, a PoS mechanism, a DPoS mechanism, or a PBFT mechanism). A person skilled in the art may learn that, because the blockchain system runs under a corresponding consensus mechanism, it is difficult for data that has been recorded in a blockchain database to be tampered with by any node. For example, if a PoW consensus blockchain is used, at least 51% of the computing power of the entire network is required to tamper with existing data. Therefore, the blockchain system has characteristics for ensuring data security and preventing attack and tampering that are unmatched by other centralized database systems. In some embodiments, the data recorded in the distributed database of the blockchain cannot be attacked or tampered with, thereby ensuring authenticity and fairness of the service behavior data used as a basis for the claim settlement agency to review the claims.

Both of the claim settlement agency party and the node device of the service processing agency party described herein may be added to the blockchain as nodes of the blockchain by following a corresponding node protocol and running an installation of a node protocol program. For a person skilled in the art, a terminal device having a full data backup of a blockchain distributed database is generally referred to as a node, a terminal device having a portion of backup data (for example, data with only a block header) of a blockchain distributed database is referred to as a client, and so on. The node devices described herein are not limited to the foregoing node or client, and any terminal that is directly or indirectly connected to the foregoing blockchain and that may send and obtain data of the distributed database of the blockchain may be referred to as the node device described herein.

The foregoing blockchain-based claim settlement method includes the following steps:

Step 102. Obtaining, from a distributed database of the blockchain, a target transaction sent by the node device of the service processing agency party, where the target transaction includes service behavior data generated by a claimant in the node device of the service processing agency party.

The claim settlement agency party in some embodiments is an agency that reviews the service behavior data of the claims to specify corresponding claim settlement solution logic, for example, each independent insurance company or a claim settlement service platform agency set up by a plurality of insurance companies in a unified manner. The service processing agency described in some embodiments is a service processing agency related to an insured service (or insurance service). When a claimant object is a physical health status of a person, a corresponding service processing agency is a medical service agency such as a general hospital, a specialized clinic, or a personalized medical service (for example, genetic testing or physical examination) company. When the claimant object is a use status of a vehicle, a corresponding service processing agency is an agency for auto repair, auto body shop, auto refit, and the like. With the development of the insurance service, more and more things or statuses of things are included in the scope of insurance or claims, and corresponding service processing agencies may all belong to the service processing agency described in some embodiments. Therefore, the claimant described in some embodiments is the foregoing insured or claimant object, or an entity related to the object. In some embodiments, the "logic" described in this specification may refer to an algorithm or executable instructions in the form of computer code or the like.

The transaction described in this specification refers to a piece of data that is created by a user of each party by using a node device end of a blockchain and that needs to be finally published to the distributed database of the blockchain. The transaction in the blockchain includes a transaction in a narrow sense and a transaction in a broad sense. The transaction in a narrow sense refers to a value transfer published by a user to a blockchain. For example, in a conventional bitcoin blockchain network, the transaction may be a transfer of balance initiated by a user in a blockchain. The transaction in a broad sense refers to a piece of service data with a service intention published by a user to a blockchain. For example, the transaction may be a service (for example, a rental service, a vehicle scheduling service, an insurance claim service, a credit service, or a medical service) message or a service request that is published by a user in a blockchain, that is not related to a value transfer, and that has a service intention. The target transaction described in the foregoing embodiments of this specification is a message, for example, medical record information of a user, or maintenance record information of a vehicle, that is sent by a user of the foregoing service processing agency party depending on the node device thereof and that includes service behavior data generated by the claimant in the service processing agency.

A detailed process of uploading the foregoing target transaction to the distributed database of the blockchain may be set according to a consensus mechanism and a transaction rule of the blockchain. In some embodiments, the uploading the target transaction to the distributed database of the blockchain includes: adding, by nodes with an accounting permission in the blockchain, the target transaction to candidate blocks; determining, in the nodes with an accounting permission, a consensus accounting node that meets the blockchain consensus mechanism; broadcasting, by the consensus accounting node, the candidate blocks to nodes of the blockchain; and adding, after the candidate blocks are verified and approved by a preset quantity of nodes in the blockchain, as latest blocks to the distributed database of the blockchain. The foregoing verification includes, but not limited to, verification in aspects such as a format and legitimacy of a transaction.

In the foregoing embodiments, nodes with an accounting permission refer to nodes with a permission to generate candidate blocks, and may include the claim settlement agency party or the service processing agency party node described in this specification, and other nodes in the foregoing blockchain. According to the consensus mechanism of the blockchain, a consensus accounting node may be determined in the foregoing nodes with an accounting permission for the candidate blocks. The foregoing consensus mechanism may include a Proof of Work (PoW) mechanism, a Proof of Stake (PoS) mechanism, a Delegated Proof of Stake (DPoS) mechanism, or the like.

The PoS or DPoS consensus mechanism is similar to the PoW, and either belongs to a consensus algorithm commonly used to determine the consensus accounting node in a public blockchain. In some embodiments, to reduce transaction or data confirmation time, increase transaction throughput, and meet requirements for security and performance, in the embodiments provided in this specification, a consortium chain architecture may be further selected to construct the blockchain. The foregoing node device of the claim settlement agency party and the node device of the service processing agency party, and a supervision agency (for example, a government agency such as the Insurance Regulatory Commission) related to insurance and claim behaviors may be used as member node devices of the consortium chain, and may be used as preselected nodes of the consortium chain, to participate in block accounting. A consensus process of the consortium chain is also controlled by the preselected nodes. When more than a set proportion (for example, 2/3) of nodes in the network confirm a block, the transaction or data recorded in the block is confirmed throughout the network.

The consortium chain generally mostly uses consensus algorithms such as the PoS, the PBFT and the RAFT. During implementation, before each round of consensus in the blockchain starts, a primary node device, that is, the consensus accounting node described in the foregoing embodiment, may be elected from the node devices in the blockchain (for example, in each round of consensus, a primary node device is re-elected, and other node devices are used as secondary node devices). The primary node device further initiates verification and consensus on the transaction and is responsible for creating the latest block for the blockchain based on the transaction data (or the target data) that passes the consensus. It should be noted herein that, in a process of reaching a consensus by the consortium chain based on the PBFT algorithm, specific content of the foregoing verification may be separately set in detail according to specific application scenario requirements of the consortium chain. This is not limited herein.

As an example of an implementation of the consensus algorithm of the consortium chain provided in some embodiments, the PBFT algorithm may meet the requirements of a high-frequency trading volume due to high consensus efficiency using such an algorithm. For example, in some embodiments, a node device of each service processing agency party frequently generates service behavior data about the claimant. Correspondingly, the node device of the service processing agency party sends target transactions to the blockchain very frequently. The PBFT algorithm has a low consensus latency, basically meets the requirements of real-time processing, and can quickly record the foregoing target transaction in a new block of the blockchain in real time. Moreover, trusted nodes in a consortium chain network are used as preselected accounting nodes, thereby taking both of security and stability into account. In addition, the PBFT algorithm does not consume too many computing power resources of a computer, does not necessarily require the circulation of tokens, and therefore, has good usability.

Although this specification provides some embodiments for the node device of the service processing agency party to provide the foregoing target transaction in real time, a manner of uploading the foregoing target transaction by the service processing agency party is not limited in this specification. The target transaction may not only be uploaded in real time after the service behavior data of the user is generated, but also be uploaded in time intervals according to a preset data uploading rule.

In response to a consensus result achieved from consensus processing of one of the candidate blocks, the one candidate block is stored to the distributed database of the blockchain as the newest block, to complete evidence preservation of the service behavior data of the claimant. The consensus mechanism of the blockchain and the distributed storage and backup mechanism ensure that it is difficult for any user to tamper with the target transaction recorded in the distributed database of the blockchain, to provide evidence preservation for the claim settlement agency party to obtain the authentic and effective service behavior data of the claimant, thereby effectively preventing a behavior of tampering with data to perform insurance fraud from occurring. In addition, when the claim settlement agency party obtains the service behavior data of the claimant from the foregoing blockchain for reviewing the claims, even if the node device of the service processing agency party runs into a system exception, normal execution of the foregoing claim review and claim settlement is still not affected.

In still another embodiment provided in this specification, to ensure the legitimacy and validity of the target transactions that relate to the service behavior data of the claimant and that are sent by the node device of the service processing agency party, and to prevent other nodes from pretending to be the service processing agency party and sending forged service behavior data, the foregoing target transaction should include a digital signature of the foregoing service processing agency party, and the digital signature should be added, by using a private key of the service processing agency party, to at least the service behavior data generated by the claimant, thereby ensuring that the service behavior data cannot be maliciously tampered with by other terminals or nodes. Correspondingly, when using the service behavior data of the foregoing target transaction, the claim settlement agency party should first perform verification on the foregoing digital signature by using a public key of the foregoing service processing agency party, treats the foregoing target transaction including the service behavior data of the claimant as valid content only after the signature verification succeeds, and formulates claim settlement solution logic based on the valid content.

The service behavior data described in some embodiments generally relates to some privacy information of the claimant, such as identity information, personal health, or property information. Therefore, to further protect the privacy of the claimant from being obtained by an irrelevant party, in some embodiments, at least the foregoing service behavior data in the target transaction may be encrypted for protection. A plurality of encryption methods may be used. For example, the node device of the service processing agency party may encrypt, by using the public key of the claim settlement agency party, at least the foregoing service behavior data included in the target transaction. Correspondingly, the foregoing claim settlement agency party may decrypt the foregoing encrypted service behavior data by using a private key corresponding to the foregoing public key, to obtain plaintext of the foregoing service behavior data. The foregoing specific algorithm adopted for a public-private key pair is not limited herein. For example, algorithms, such as an RSA and an ECDSA, can each be adopted to obtain the foregoing available public-private key pair.

Step 104. Generating claim settlement solution logic for the claimant based on the service behavior data included in the target transaction.

The claim settlement agency party, such as an insurance company, generally reviews claims based on the service behavior data included in the foregoing target transaction according to an insurance system or strategy executed by the company, for example, checks whether the service behavior data of the claimant falls within the scope of insurance claims, and generates claim settlement solution logic for the claimant. The foregoing claim settlement solution logic may include content such as a claim period, a claim amount, and a claim condition.

To ensure the objectivity and fairness of the claim settlement solution logic set by the claim settlement agency party, evidence preservation may be performed on an insurance claim system implemented in the claim settlement agency party on the blockchain. Because the claim settlement agency party may formulate different claim systems (that is, policies) for users to be insured, in still another shown implementation in this specification, the foregoing distributed database of the blockchain stores a policy transaction for the claimant sent by the node device of the claim settlement agency party, where the policy transaction is used for recording claim settlement logic corresponding to the claimant. Correspondingly, the generating claim settlement solution logic for the claimant based on the service behavior data included in the target transaction, and executing the claim settlement solution logic includes: obtaining the policy transaction from the distributed database of the blockchain; and generating the claim settlement solution logic for the user based on the service behavior data included in the target transaction and the policy transaction of the claimant.

A specific process in which the foregoing policy transaction is recorded to the distributed database of the blockchain is similar to a specific process in which the target transaction is recorded to the distributed database of the blockchain described above. Details are not described herein again. Through the consensus and verification by the nodes with a consensus permission in the blockchain, a direct basis for the generation of the foregoing claim settlement solution logic may be provided after the foregoing policy transaction is recorded in the distributed database of the blockchain, thereby ensuring fairness and reasonableness of the foregoing claim settlement solution logic. Similarly, to ensure that the policy transaction is indeed sent by the corresponding claim settlement agency party, and to prevent other node agencies from maliciously pretending to be the claim settlement agency party and performing evidence preservation of a false policy, the foregoing policy transaction may further include an electronic signature of the foregoing claim settlement agency party.

There may be many specific implementations for obtaining the policy transaction. For example, both of the target transaction and the policy transaction described above may include an identity code of the claimant (for example, identity information of the claimant object such as an identity number or a vehicle identity code). After the target transaction of the claimant is obtained, data retrieval is performed based on the identity code of the claimant in the blockchain database, to obtain the policy transaction corresponding to the identity code of the claimant. In another example, the foregoing target transaction may directly include or link a policy transaction identity (such as a TXID of the policy transaction) of the foregoing claimant, and the policy transaction of the claimant may be obtained when data retrieval is performed based on the policy transaction identity in a blockchain database.

In an actual service scenario in which the claim settlement is performed, the claim settlement agency party may further need to complete formulation of the foregoing claim settlement solution logic according to some other content or transactions. A medical insurance claim scenario is used as an example. The service processing agency party is a hospital, the foregoing claimant is a medical insurance agency (which may include a social medical insurance agency or a commercial medical insurance agency), and the claimant is a patient user. The foregoing blockchain is based on a consortium chain created by agencies involved in medical insurance, for example, a hospital, a drug agency, a medical insurance agency, and a supervision agency such as a medical insurance supervision agency, as consortium members. The foregoing drug agency party includes, but not limited to, a company or an agency related to drugs and instruments such as drugs, medical consumables, and medical devices. Therefore, the distributed database of the foregoing consortium chain may further record a drug pricing transaction sent by the member node device of the drug agency party, and the drug pricing transaction includes a drug price, which is used for providing a basis for the generation of the foregoing claim settlement solution logic.

Step 106. Executing the claim settlement solution logic.

The executing the foregoing claim settlement solution logic includes an execution manner, for example, sending a notification about the claim settlement solution logic (including whether to pay the claims) to the claimant, or paying claims to the claimant according to the period and the claim amount of the foregoing claim settlement solution logic. In still another shown implementation of this specification, the blockchain further includes a node device of a claimant. That is, the foregoing claimant may be used as a node or a client of the blockchain. When the foregoing claim settlement solution logic includes a claim amount that should be paid to the claimant, a transfer transaction with an amount equal to the claim amount may be directly initiated to the claimant on the blockchain.

That the transfer amount is equal to the foregoing claim amount may be understood that an asset certificate corresponding to the claim amount is remitted (or referred to as transferred) from a blockchain account of the claim settlement agency party or a paying agency account corresponding to the claim settlement agency party to the blockchain account of the claimant. The asset certificate may correspond to an intelligent asset, such as a token and a digital asset, in a blockchain, and the asset certificate may also correspond to an off-chain asset such as cash, a bond, a coupon, or a building property. This is not limited in this specification.

As described above, the foregoing embodiments including step 102 to step 106 may be performed by the claim settlement agency party, or may be performed by a corresponding claim settlement clearing agency authorized by the claim settlement agency party. In some embodiments, to further ensure justice, fairness, and openness of the claim process described in the foregoing embodiments, the procedures of generating claim settlement solution logic for the claimant based on the service behavior data included in the target transaction and executing the claim settlement solution logic described in the foregoing one or more embodiments may be compiled and deployed as generation logic of the claim settlement solution logic and execution logic of the claim settlement solution logic that are executable by the smart contract, and after being verified by the consensus nodes of the foregoing blockchain by consensus, a consensus of the foregoing smart contract is achieved, and the smart contract is deployed to the blockchain. In this way, the smart contract deployed in the foregoing blockchain is invoked by using the target transaction sent by the foregoing service processing agency party, to generate the claim settlement solution logic for the claimant, and the smart contract automatically executes the claim settlement solution logic, for example, the transfer operation described in the foregoing one embodiment.

The smart contract may be automatically executed at any time because the smart contract may be invoked according to the target transaction, thereby greatly improving the efficiency of claim processing. In addition, the consensus mechanism of the blockchain ensures that the execution logic declared by the smart contract is just and open after the execution logic is verified by the consensus nodes of the blockchain by consensus, and a transparent execution manner on the blockchain has advantages of relatively low human intervention and decentralization authority.

Figure 3:
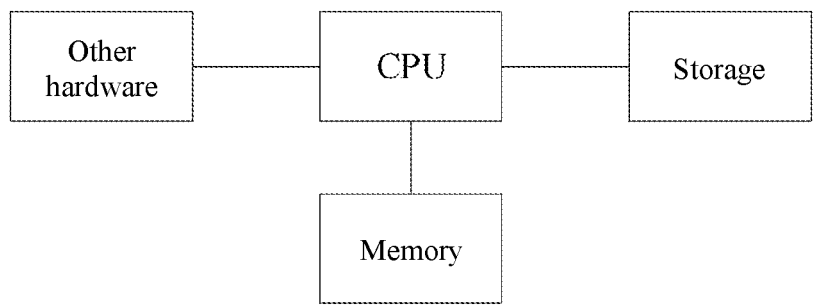
FIG. 3 is a structural diagram of hardware of a blockchain-based claim settlement apparatus, according to an embodiment of this specification.

Corresponding to the implementation of the foregoing procedure, the embodiments of this application further provide a blockchain-based public transportation data processing apparatus. The apparatus may be implemented by software, or by hardware or a combination of software and hardware. A software implementation is used as an example. The software, as a logical apparatus, is formed by reading corresponding computer program instructions into a memory by a central process unit a processor (CPU) of a device where the apparatus is located. In terms of hardware, in addition to the CPU, the memory, and the storage shown in FIG. 3, the device for implementing the network risk service generally further includes other hardware such as a chip that receives and sends a wireless signal, and/or other hardware such as a board for implementing a network communication function.

Figure 2:
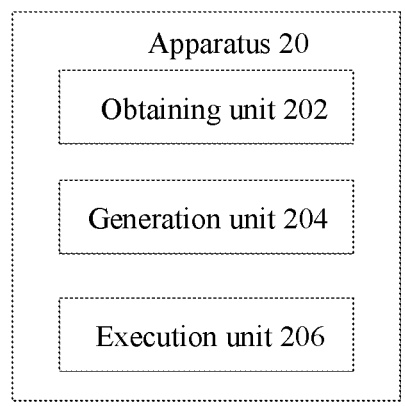
FIG. 2 is a schematic diagram of a blockchain-based claim settlement apparatus, according to an embodiment of this specification.

FIG. 2 shows a blockchain-based claim settlement apparatus 20. The blockchain includes a node device of a claim settlement agency party and a node device of a service processing agency party. The apparatus 20 includes: an obtaining unit 202 configured to obtain, from a distributed database of the blockchain, a target transaction sent by the node device of the service processing agency party, where the target transaction includes service behavior data generated by a claimant in the node device of the service processing agency party; a generation unit 204 configured to generate claim settlement solution logic for the claimant based on the service behavior data included in the target transaction; and an execution unit 206 configured to execute the claim settlement solution logic.

In still another shown implementation, the blockchain further includes a node device of a claimant, and the claim settlement solution logic includes a claim amount to be paid to the claimant.

The execution unit 206 is configured to initiate a transfer transaction with an amount equal to the claim amount to a terminal of the claimant via the blockchain.

In still another shown implementation, the distributed database of the blockchain stores a policy transaction for the claimant sent by the node device of the claim settlement agency party, where the policy transaction is used for recording claim settlement logic corresponding to the claimant.

The generation unit 204 is configured to: obtain the policy transaction from the distributed database of the blockchain; and generate the claim settlement solution logic for the claimant based on the service behavior data included in the target transaction and the policy transaction of the claimant.

In still another implementation, the service behavior data is encrypted by a public key of the claim settlement agency party. The apparatus 20 further includes: a decryption unit configured to decrypt the encrypted service behavior data by the claim settlement agency party using a private key corresponding to the public key.

In still another shown implementation, the generation unit 204 and the execution unit 206 are configured to: invoke a smart contract deployed on the blockchain, and complete the claim settlement solution logic for the claimant and execute the claim settlement solution logic based on generation logic of the claim settlement solution logic and execution logic of the claim settlement solution logic declared in the smart contract.

In still another shown implementation, the blockchain is a consortium chain, and the node device of the claim settlement agency party and the node device of the service processing agency party are member node devices of the consortium chain.

In still another shown implementation, the service processing agency party is a hospital, the claim settlement party is a medical insurance agency, and the claimant is a patient user. The consortium chain further includes a member node device of a drug agency party, a distributed database of the consortium chain records a drug pricing transaction sent by the member node device of the drug agency party, and the drug pricing transaction includes a drug price.

In some embodiments, the various units or modules of the blockchain-based claim settlement apparatus 20 may be implemented as software instructions or a combination of software and hardware. For example, the blockchain-based claim settlement apparatus 20 (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the blockchain-based claim settlement apparatus 20 may include a server, a mobile phone, a tablet computer, a PC, a laptop computer, or a combination of one or more of these computing devices.

Reference to the implementation processes of corresponding steps in the foregoing method may be made for details of the implementation processes of the functions and effects of the units in the device. For corresponding parts, refer to some of the descriptions in the method embodiments. Details are not described herein again.

The foregoing described apparatus embodiments are merely examples. The units described as separate components may or may not be physically separated, and the components displayed as units may or may not be physical modules/units, may be located in one position, or may be distributed on a plurality of network modules/units. A portion or all of the units or modules may be selected according to actual requirements to achieve the objectives of the solutions of this specification. A person of ordinary skill in the art may understand and implement the objective without creative efforts.

The apparatus, the unit, or the module described in the foregoing embodiments can be implemented by a computer chip or an entity or implemented by a product having a specified function. A typical implementation device is a computer, and a specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any of these devices.

Corresponding to the foregoing method embodiments, the embodiments of this specification further provide a computer device. The computer device includes a storage and a processor. The storage stores a computer program executable on the processor. The processor, when executing the stored computer program, performs the steps of the blockchain-based claim settlement method in the embodiments of this specification. For detailed description of the steps of the blockchain-based claim settlement method, refer to the foregoing content. Details are not described again.

The foregoing descriptions are merely some embodiments of this specification, but are not intended to limit this specification. Any modification, equivalent replacement, or improvement made without departing from the spirit and principle of this specification should fall within the protection scope of this specification.

In a typical configuration, the computer device includes one or more processors (CPUs), an input/output interface, a network interface, and a memory.

The memory may include, among computer readable media, a non-persistent memory such as a random access memory (RAM) and/or a nonvolatile memory such as a read-only memory (ROM) or a flash memory (flash RAM). The memory is an example of the computer readable medium.

The computer-readable medium includes a persistent medium and a non-persistent medium, a removable medium and a non-removable medium, which may implement storage of information by using any method or technology. The information may be computer-readable instructions, a data structure, a module of a program or other data.

An example of a computer storage medium includes but is not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape or disc storage or another magnetic storage device or any other non-transmission media that may be configured to store information that a computing device can access. Based on the definition in this specification, the computer-readable medium does not include transitory computer readable media (transitory media), such as a modulated data signal and a carrier.

It should also be noted that the terms "include," "comprise," and any other variants mean to cover the non-exclusive inclusion. Thereby, the process, method, article, or device that includes a series of elements not only includes those elements, but also includes other elements that are not clearly listed, or further includes the inherent elements of the process, method, article, or device. Without further limitation, the element defined by a phrase "include one" does not exclude other same elements in the process, method, article, or device that include the element.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

What is claimed is:

1. A blockchain-based claim settlement method, wherein a blockchain comprises a node device of a claim settlement agency party and a node device of a service processing agency party, and the method comprises:
   obtaining, by the node device of the claim settlement agency party from a distributed database of the blockchain, a target transaction sent to the blockchain by the node device of the service processing agency party, wherein the target transaction comprises service behavior data of a claimant;
   invoking, by the node device of the claim settlement agency party through the target transaction, a smart contract deployed on the blockchain, wherein the smart contract includes generation logic executable through the smart contract to generate claim settlement solution logic and includes execution logic executable through the smart contract to execute the claim settlement solution logic;
   executing, by the node device of the claim settlement agency party through the smart contract, the generation logic to generate the claim settlement solution logic based on the service behavior data included in the target transaction; and
   executing, by the node device of the claim settlement agency party through the smart contract, the claim settlement solution logic according to the execution logic of the claim settlement solution logic.

2. The method according to claim 1, wherein the blockchain further comprises a node device of the claimant, and the claim settlement solution logic comprises a claim amount to be paid to the claimant; and
   the executing the claim settlement solution logic comprises initiating a transfer transaction with an amount equal to the claim amount to a terminal of the claimant via the blockchain.

3. The method according to claim 1, wherein the distributed database of the blockchain stores a policy transaction for the claimant sent by the node device of the claim settlement agency party, wherein the policy transaction is used for recording claim settlement logic corresponding to the claimant; and
   the generating claim settlement solution logic for the claimant based on the service behavior data included in the target transaction comprises:
   obtaining the policy transaction from the distributed database of the blockchain; and
   generating the claim settlement solution logic for the claimant based on the service behavior data included in the target transaction and the policy transaction of the claimant.

4. The method according to claim 1, wherein the service behavior data is encrypted by a public key of the claim settlement agency party, and the method further comprises:
   decrypting, by the node device of the claim settlement agency party, the encrypted service behavior data by using a private key corresponding to the public key.

5. The method according to claim 1, wherein the blockchain is based on a PBFT (Practical *Byzantine* Fault Tolerance) consensus algorithm.

6. The method according to claim 1, wherein the blockchain is a consortium chain, and the node device of the claim settlement agency party and the node device of the service processing agency party are member node devices of the consortium chain.

7. The method according to claim 6, wherein the service processing agency party corresponds to a hospital, the claim settlement party corresponds to a medical insurance agency, and the claimant is a patient user; and the consortium chain further comprises a member node device of a drug agency, the distributed database records a drug pricing transaction sent by the member node device of the drug agency, and the drug pricing transaction comprises a drug price.

8. One or more non-transitory computer-readable storage media storing instructions executable by one or more processors, wherein execution of the instructions causes the one or more processors to perform operations comprising:
   obtaining, from a distributed database of a blockchain comprising a node device of a claim settlement agency party and a node device of a service processing agency party, a target transaction sent to the blockchain by the node device of the service processing agency party, wherein the target transaction comprises service behavior data of a claimant;
   invoking, through the target transaction, a smart contract deployed on the blockchain, wherein the smart contract includes generation logic executable through the smart contract to generate claim settlement solution logic and includes execution logic executable through the smart contract to execute the claim settlement solution logic;

executing, through the smart contract, the generation logic to generate the claim settlement solution logic based on the service behavior data included in the target transaction; and executing, through the smart contract, the claim settlement solution logic according to the execution logic of the claim settlement solution logic.

9. The one or more non-transitory computer-readable storage media according to claim 8, wherein the blockchain further comprises a node device of the claimant, and the claim settlement solution logic comprises a claim amount to be paid to the claimant; and the executing the claim settlement solution logic comprises initiating a transfer transaction with an amount equal to the claim amount to a terminal of the claimant via the blockchain.

10. The one or more non-transitory computer-readable storage media according to claim 8, wherein the distributed database of the blockchain stores a policy transaction for the claimant sent by the node device of the claim settlement agency party, wherein the policy transaction is used for recording claim settlement logic corresponding to the claimant; and the generating claim settlement solution logic for the claimant based on the service behavior data included in the target transaction comprises:

obtaining the policy transaction from the distributed database of the blockchain; and generating the claim settlement solution logic for the claimant based on the service behavior data included in the target transaction and the policy transaction of the claimant.

11. The one or more non-transitory computer-readable storage media according to claim 8, wherein the service behavior data is encrypted by a public key of the claim settlement agency party, and the operations further comprise:

decrypting the encrypted service behavior data by using a private key corresponding to the public key.

12. The one or more non-transitory computer-readable storage media according to claim 8, wherein the blockchain is based on a PBFT (Practical *Byzantine* Fault Tolerance) consensus algorithm.

13. The one or more non-transitory computer-readable storage media according to claim 8, wherein the blockchain is a consortium chain, and the node device of the claim settlement agency party and the node device of the service processing agency party are member node devices of the consortium chain.

14. The one or more non-transitory computer-readable storage media according to claim 13, wherein the service processing agency party corresponds to a hospital, the claim settlement party corresponds to a medical insurance agency, and the claimant is a patient user; and the consortium chain further comprises a member node device of a drug agency, the distributed database records a drug pricing transaction sent by the member node device of the drug agency, and the drug pricing transaction comprises a drug price.

15. A system comprising one or more processors and one or more non-transitory computer-readable memories coupled to the one or more processors and configured with instructions executable by the one or more processors to cause the system to perform operations comprising:

obtaining, from a distributed database of a blockchain comprising a node device of a claim settlement agency party and a node device of a service processing agency party, a target transaction sent to the blockchain by the node device of the service processing agency party, wherein the target transaction comprises service behavior data of a claimant;

invoking, through the target transaction, a smart contract deployed on the blockchain, wherein the smart contract includes generation logic executable through the smart contract to generate claim settlement solution logic and includes execution logic executable through the smart contract to execute the claim settlement solution logic;

executing, through the smart contract, the generation logic to generate the claim settlement solution logic based on the service behavior data included in the target transaction; and executing, through the smart contract, the claim settlement solution logic according to the execution logic of the claim settlement solution logic.

16. The system according to claim 15, wherein the blockchain further comprises a node device of the claimant, and the claim settlement solution logic comprises a claim amount to be paid to the claimant; and the executing the claim settlement solution logic comprises initiating a transfer transaction with an amount equal to the claim amount to a terminal of the claimant via the blockchain.

17. The system according to claim 15, wherein the distributed database of the blockchain stores a policy transaction for the claimant sent by the node device of the claim settlement agency party, wherein the policy transaction is used for recording claim settlement logic corresponding to the claimant; and the generating claim settlement solution logic for the claimant based on the service behavior data included in the target transaction comprises:

obtaining the policy transaction from the distributed database of the blockchain; and generating the claim settlement solution logic for the claimant based on the service behavior data included in the target transaction and the policy transaction of the claimant.

18. The system according to claim 15, wherein the service behavior data is encrypted by a public key of the claim settlement agency party, and the operations further comprise:

decrypting the encrypted service behavior data by using a private key corresponding to the public key.

19. The system according to claim 15, wherein the blockchain is based on a PBFT (Practical *Byzantine* Fault Tolerance) consensus algorithm.

20. The system according to claim 15, wherein the blockchain is a consortium chain, and the node device of the claim settlement agency party and the node device of the service processing agency party are member node devices of the consortium chain.

* * * * *